United States Patent
Inoue et al.

(10) Patent No.: US 12,339,355 B2
(45) Date of Patent: Jun. 24, 2025

(54) MOUNTING STRUCTURE OF OBJECT DETECTION DEVICE TO VEHICLE BODY

(71) Applicant: Honda Motor Co., Ltd., Tokyo (JP)

(72) Inventors: Naoto Inoue, Tokyo (JP); Go Shimizu, Tokyo (JP); Ryoya Kobayashi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 17/973,483

(22) Filed: Oct. 25, 2022

(65) Prior Publication Data

US 2023/0204761 A1    Jun. 29, 2023

(30) Foreign Application Priority Data

Dec. 28, 2021    (JP) .................................. 2021-215000

(51) Int. Cl.
*G01S 13/931*    (2020.01)
*B60R 11/00*    (2006.01)
*G01S 7/02*    (2006.01)

(52) U.S. Cl.
CPC ............ *G01S 13/931* (2013.01); *B60R 11/00* (2013.01); *G01S 7/027* (2021.05); *B60R 2011/0043* (2013.01)

(58) Field of Classification Search
CPC ......... H01Q 1/42; G01S 13/931; G01S 7/027; B60R 11/00; B60R 2011/0043
See application file for complete search history.

(56) References Cited

U.S. PATENT DOCUMENTS

| | | | |
|---|---|---|---|
| 6,008,750 A * | 12/1999 | Cottle | H01Q 1/3233 342/42 |
| 7,019,685 B2 * | 3/2006 | Suzuki | G01S 7/032 180/167 |

(Continued)

FOREIGN PATENT DOCUMENTS

| JP | S5962051 | 4/1984 |
|---|---|---|
| JP | H10261307 | 9/1998 |

(Continued)

OTHER PUBLICATIONS

"Office Action of Japan Counterpart Application", issued on Oct. 24, 2023, with English translation thereof, p. 1-p. 14.

(Continued)

*Primary Examiner* — Peter M Bythrow
(74) *Attorney, Agent, or Firm* — JCIPRNET (57) ABSTRACT

The disclosure provides a mounting structure of an object detection device to a vehicle body capable of improving the accuracy of object detection by the object detection device and improving the durability of the object detection device. A mounting structure of a radar device, which is an object detection device for detecting objects, to a vehicle body includes: a support bracket attached to the vehicle body side for supporting the radar device in a first direction, which is an object detection direction by the radar device; and a cover member fixed to the first direction side of the support bracket and disposed on the first direction side of the radar device. The radar device is housed in a housing chamber defined by the cover member and the support bracket.

17 Claims, 8 Drawing Sheets

(56) References Cited

U.S. PATENT DOCUMENTS

| | | | | |
|---|---|---|---|---|
| 7,126,525 | B2* | 10/2006 | Suzuki | H01Q 17/001 342/175 |
| 8,614,640 | B2* | 12/2013 | Lynam | B60T 7/22 342/55 |
| 9,673,517 | B2* | 6/2017 | Tran | H01Q 1/42 |
| 10,473,754 | B2* | 11/2019 | Park | H01Q 1/3233 |
| 10,793,093 | B2* | 10/2020 | Callewaert | H01Q 1/422 |
| 10,793,095 | B2* | 10/2020 | Horiuchi | B62D 25/082 |
| 11,073,600 | B2* | 7/2021 | Hellinger | H01Q 1/3233 |
| 11,131,770 | B2* | 9/2021 | Park | H01Q 1/32 |
| 11,662,423 | B2* | 5/2023 | Gligor | B60R 11/00 73/866.5 |
| 2001/0040524 | A1* | 11/2001 | Suzuki | H01Q 23/00 342/175 |
| 2016/0033621 | A1* | 2/2016 | Ottenhues | G01S 7/032 342/175 |
| 2018/0006365 | A1* | 1/2018 | Powell | H01Q 1/42 |
| 2018/0215086 | A1* | 8/2018 | Geise | B29C 45/1671 |
| 2020/0292669 | A1* | 9/2020 | Bae | G01S 17/931 |
| 2021/0227104 | A1* | 7/2021 | Krishnan | G07C 9/00571 |
| 2021/0364631 | A1* | 11/2021 | Hasegawa | G01S 13/86 |
| 2022/0349220 | A1* | 11/2022 | Ferri | G01S 13/87 |
| 2022/0352640 | A1* | 11/2022 | Brandenburg | H01Q 1/38 |
| 2022/0365207 | A1* | 11/2022 | Corner | H01Q 21/08 |
| 2022/0404489 | A1* | 12/2022 | Kikuchi | H01Q 1/42 |
| 2023/0296762 | A1* | 9/2023 | Uenaga | H01Q 1/42 342/455 |

FOREIGN PATENT DOCUMENTS

| | | |
|---|---|---|
| JP | H11142514 | 5/1999 |
| JP | 2000209026 | 7/2000 |
| JP | 2001260777 | 9/2001 |
| JP | 2004312696 | 11/2004 |
| JP | 2011196938 | 10/2011 |
| JP | 2012225731 | 11/2012 |
| JP | 2014119303 | 6/2014 |
| JP | 2015063196 | 4/2015 |
| JP | 2018134936 | 8/2018 |
| JP | 2020038181 | 3/2020 |
| JP | 2020051974 | 4/2020 |
| JP | 2020524777 | 8/2020 |

OTHER PUBLICATIONS

"Office Action of Japan Counterpart Application" with English translation thereof, issued on Jul. 25, 2023, p. 1-p. 10.

* cited by examiner

MOUNTING STRUCTURE OF OBJECT DETECTION DEVICE TO VEHICLE BODY

CROSS-REFERENCE TO RELATED APPLICATION

This application claims the priority benefit of Japan application serial no. 2021-215000, filed on Dec. 28, 2021. The entirety of the above-mentioned patent application is hereby incorporated by reference herein and made a part of this specification.

BACKGROUND

Technical Field

The disclosure relates to a mounting structure of an object detection device, such as a radar device, to a vehicle body for detecting objects around a vehicle.

Related Art

In recent years, the development of technology that contributes to vehicle collision avoidance and collision impact mitigation by installing a radar device, which is an object detection device that detects objects, in a vehicle and detecting obstacles in front of the vehicle with the radar device is in progress. As an example of mounting such a radar device on a vehicle, for example, the technology disclosed in Patent Literature 1 is known.

Patent Literature 1 discloses a structure in which a radar, which is an object detection device, is attached to a mounting member extending downward from a lamp body housing of a headlight mounted on a vehicle, and a cover is provided in front of the radar.

CITATION LIST

Patent Literature

[Patent Literature 1] Japanese Patent Application Laid-Open No. 2020-038181

However, in the conventional structure described in Patent Literature 1, the radar device is disposed at a position protruding below the lamp chamber of the headlight, which limits the layout configuration of the radar device, and there is a possibility that the detection accuracy cannot be sufficiently improved. Moreover, if access to the radar device is not easy, it may take time and effort to replace or maintain the radar device. Furthermore, if a part of the radar device is not covered, there is a concern that the radar device may be submerged by rainwater or the like from the underside of the vehicle body.

In view of the above, the disclosure provides a mounting structure of an object detection device to a vehicle body which has a simple configuration and is capable of improving the accuracy of object detection by the object detection device and improving the durability of the object detection device.

SUMMARY

In view of the above, a mounting structure of an object detection device to a vehicle body according to the disclosure includes: a support bracket (20) attached to the vehicle body side for supporting the object detection device (40) in a first direction, which is an object detection direction by the object detection device (40); and a cover member (60) fixed to the first direction side of the support bracket (20) and disposed on the first direction side of the object detection device (40). The object detection device (40) is housed in a housing chamber (70) defined by the cover member (60) and the support bracket (20).

DESCRIPTION OF THE EMBODIMENTS

According to the mounting structure of the object detection device to the vehicle body according to the disclosure, although the structure is simple, the object detection device is supported via the support bracket, so that the positioning of the object detection device may be performed easily and accurately. In addition, since the object detection device is housed in the housing chamber defined by the cover member and the support bracket, the object detection device may be protected from being exposed to water from the outside and the like. Therefore, the object detection accuracy of the object detection device may be improved, and the durability of the object detection device may be improved.

Further, in this mounting structure of the object detection device to the vehicle body, the support bracket (20) may include an opening (24) that faces the object detection device (40), and the object detection device (40) may be detachably mounted through the opening (24).

According to this configuration, the support bracket has an opening that faces the object detection device, and the object detection device is detachably attached through the opening; through this opening, it is possible to attach and detach the object detection device to and from the housing chamber defined by the support bracket and cover member. Therefore, it is possible to attach and detach the object detection device in the housing chamber without removing the cover member fixed to the support bracket, thereby facilitating and speeding up the assembly work, replacement and maintenance work of the object detection device.

Further, in this mounting structure of the object detection device to the vehicle body, in a state in which the object detection device (40) is supported by the support bracket (20), a connecting part (46) for connecting a wiring (52) to the object detection device (40) may be exposed to an outside of the housing chamber (70) through the opening (24).

According to this configuration, when the object detection device is supported by the support bracket, the connecting part of the object detection device is exposed to the outside of the housing chamber from the opening. Therefore, the wiring connected to the connecting part of the object detection device may be pulled out to the outside of the housing chamber and be disposed. In addition, since the connecting part is exposed to the outside of the housing chamber through the opening, the space in the housing chamber may be saved, and the degree of freedom in the layout configuration of the object detection device may be increased.

Further, in this mounting structure of the object detection device to the vehicle body, the object detection device (40) may include on one side of the object detection device, a locking part (42, 42) that is locked to an edge of the opening (24), and on another side of the object detection device, a fastening part (43) that is fastened and fixed to the edge of the opening (24) with a fastener (45).

According to this configuration, the locking part provided on one side of the object detection device is locked to the edge of the opening, and in this state, the fastening part provided on another side of the object detection device is fastened and fixed to the edge of the opening with the fastener, whereby the object detection device may be attached. Therefore, it is possible to facilitate the work of attaching and detaching the object detection device to and from the support bracket, and to reduce the number of parts by keeping the number of fasteners to be small.

Further, in this mounting structure of the object detection device to the vehicle body, the cover member (60) may be welded and fixed to the support bracket (20).

According to this configuration, since the cover member is welded and fixed to the support bracket, it is possible to reliably prevent the cover member fixed to the support bracket from coming off. Further, when the support bracket is provided with the opening, the object detection device may be attached and detached in the housing chamber through the opening, so there is no need to remove the cover member from the support bracket. Therefore, even if the cover member is welded and fixed to the support bracket, the easy maintenance of the parts is not affected. As a result, it is possible to improve the durability of the object detection device and its mounting structure to the vehicle body and ensure easy maintenance.

Further, in this mounting structure of the object detection device to the vehicle body, the support bracket (20) may be attached to a housing (10) that houses a light source (5) of a headlight unit (1) mounted on the vehicle body, and the first direction may be a direction including a front of the vehicle body.

It should be noted that the above numerals in parentheses indicate the drawing reference numerals of corresponding components in the embodiments described later, for reference.

According to the mounting structure of the object detection device to the vehicle body according to the disclosure, it is possible to improve the accuracy of object detection by the object detection device and to improve the durability of the object detection device with a simple configuration.

Hereinafter, embodiments of the disclosure will be described in detail with reference to the accompanying drawings. It should be noted that the term "front" in the following description refers to the forward direction (orientation) that is the forward direction of the vehicle body (vehicle), which will be described later. Further, left and right refer to the left and right respectively when the vehicle body (vehicle) faces the forward direction (front side).

Figure 1:
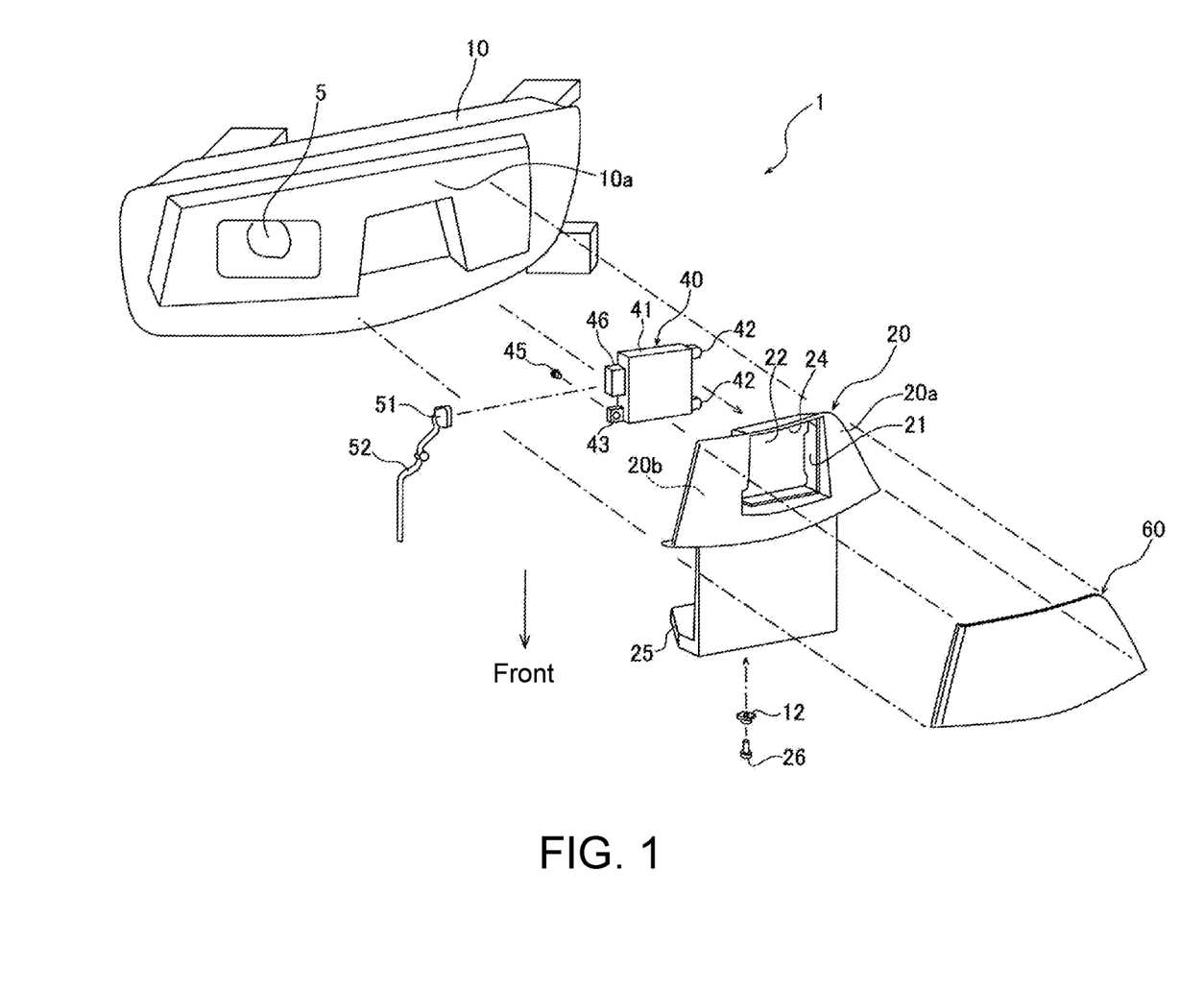
FIG. 1 is a schematic exploded perspective view showing components of a vehicle headlight unit including a mounting structure of an object detection device according to an embodiment of the disclosure.

FIG. 1 is a schematic exploded perspective view showing components of a vehicle headlight unit including a mounting structure of an object detection device according to an embodiment of the disclosure. The headlight unit 1 shown in FIG. 1 is the left headlight unit installed at the front end of the vehicle body. Note that the right headlight unit has a bilaterally symmetrical configuration with the left headlight unit 1 shown in FIG. 1, so illustration and description thereof will be omitted.

The headlight unit 1 shown in FIG. 1 includes a housing 10 that houses headlight components such as a light source 5, a radar device (object detection device) 40 attached to a front surface 10a of the housing 10 via a support bracket 20, and a cover member 60 that covers the front side of the radar device 40. The mounting structure of the radar device provided in the headlight unit 1 will be described in detail below.

Figure 2:
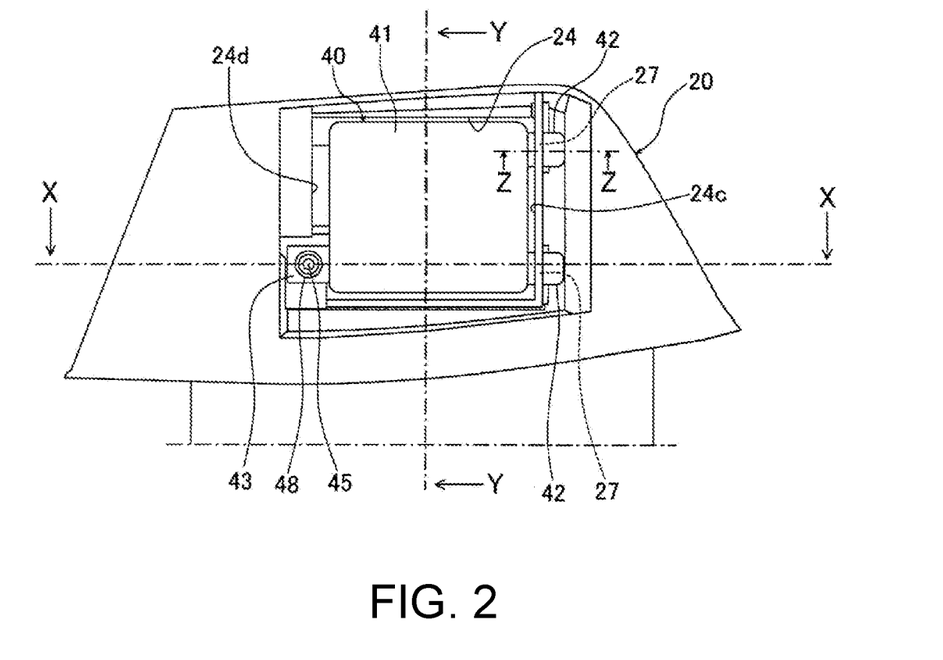
FIG. 2 is a front view of a support bracket to which the radar device is attached.
Figure 3:
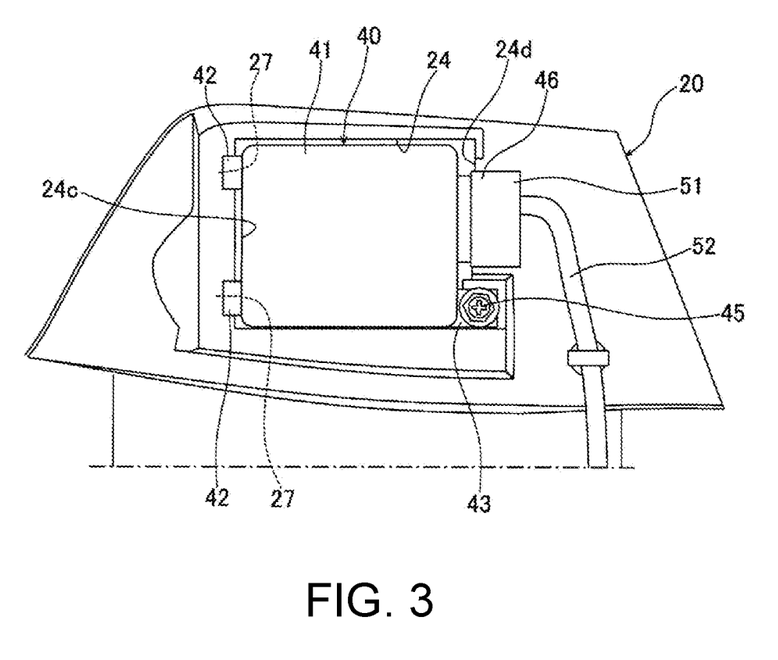
FIG. 3 is a rear view of the support bracket to which the radar device is attached.
Figure 4:
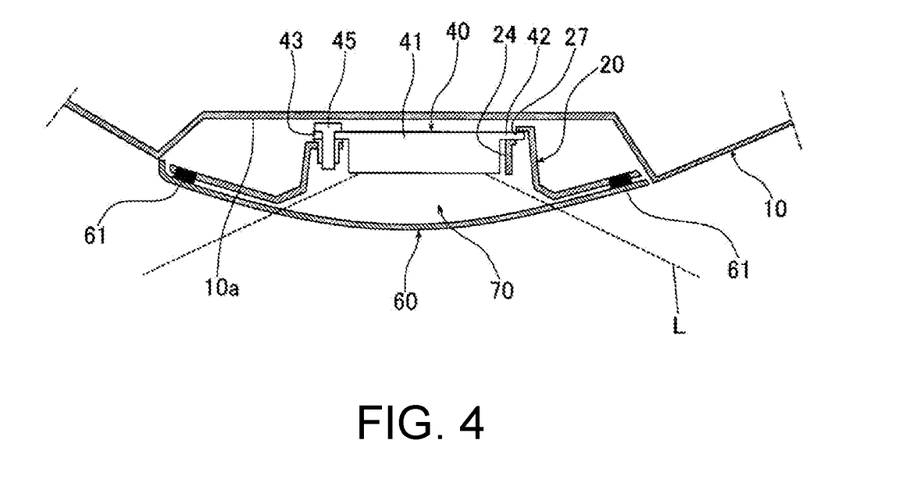
FIG. 4 is a cross-sectional view of a position corresponding to the X-X arrow of FIG. 2.
Figure 5:
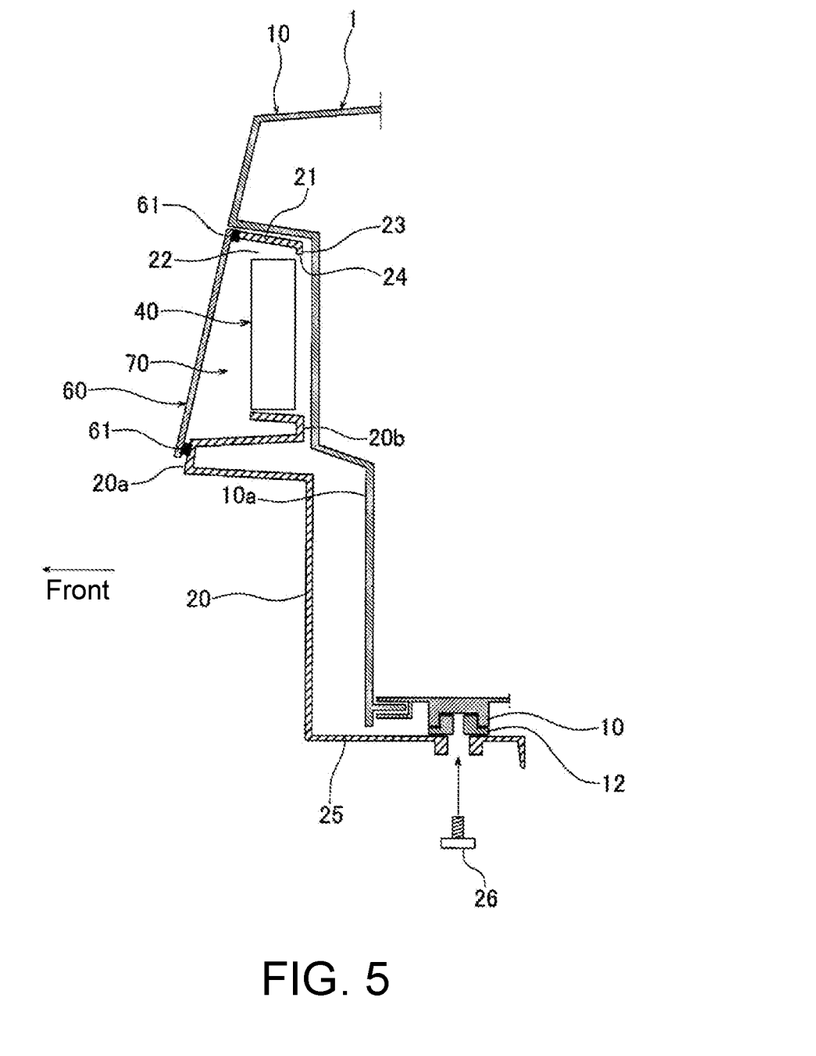
FIG. 5 is a cross-sectional view of a position corresponding to the Y-Y arrow of FIG. 2.
Figure 6:
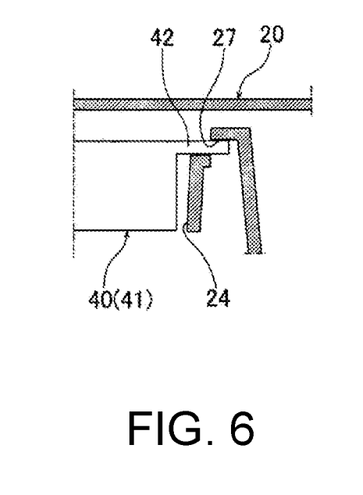
FIG. 6 is a cross-sectional view of a position corresponding to the Z-Z arrow of FIG. 2.

FIGS. 2 and 3 are views showing the support bracket to which the radar device is attached, FIG. 2 being a front view and FIG. 3 being a rear view. Further, FIG. 4 is a cross-sectional view of a position corresponding to the X-X arrow of FIG. 2; FIG. 5 is a cross-sectional view of a position corresponding to the Y-Y arrow of FIG. 2; and FIG. 6 is a cross-sectional view of a position corresponding to the Z-Z arrow of FIG. 2. Although the cover member 60 attached to the support bracket 20 is not shown in FIGS. 2 and 3, the cover member 60 is shown in FIGS. 4 and 5. As shown in these figures, the mounting structure of the radar device 40 included in the headlight unit 1 includes the support bracket 20 that is attached to the housing 10 of the headlight unit 1 and supports the radar device 40 toward the front of the vehicle body (object detection direction by the radar device 40: first direction) and a cover member 60 fixed to the support bracket 20 and disposed on the front side of the radar device 40. The radar device 40 is housed inside a housing chamber 70 (see FIGS. 4 and 5) defined by the cover member 60 and the support bracket 20. A dotted line L shown in FIG. 4 is a line indicating a range in which the radar device 40 may detect an object. The radar device 40 is capable of detecting an object on the front side of the vehicle from the dotted line L.

Both the support bracket 20 and the cover member 60 are molded products made of synthetic resin. The support bracket 20 is a member attached to the front surface 10a of the left part of the housing 10. The upper part of the support bracket 20 includes a recess 22 which is surrounded by side walls 21 (on upper, lower, left, and right sides) and recessed from the front side to the back side. A substantially rectangular opening 24 is formed in a lower part (rear side wall surface) 23 of the recess 22. The opening 24 is formed as a through hole penetrating from the front surface (front surface) 20a side of the support bracket 20 to the back surface (rear surface) 20b. The radar device 40 may be attached to the opening 24 from the rear surface 20b side of the support bracket 20, as will be described later. A lower edge 25 extending substantially horizontally toward the rear surface 20b is provided at the lower end of the support bracket 20, and the lower edge 25 is fixed to an insert nut 12 attached to the housing 10 by tightening a bolt 26. Although not shown in the drawings, the upper edge of the support bracket 20 is provided with a locking part that is locked to the housing 10 of the headlight unit 1. The support bracket 20 is fixed to the front surface 10a of the housing 10 by fastening the bolt 26 in a state where the locking part is locked.

Further, the cover member 60 is a member having a substantially rectangular outer shape and a substantially flat plate shape. The cover member 60 is attached to cover the recess 22 of the support bracket 20 from the front surface 20a side. Further, the cover member 60 is fixed to the side wall 21 that is the peripheral edge of the recess 22 of the support bracket 20 by welding a welded part 61. By fixing the cover member 60 to the support bracket 20, the recess 22 of the support bracket 20 is covered (closed) with the cover member 60. As a result, the housing chamber 70 is defined as a space in which the radar device 40 is installed between the support bracket 20 (the recess 22 of the support bracket 20) and the cover member 60.

Figure 7:
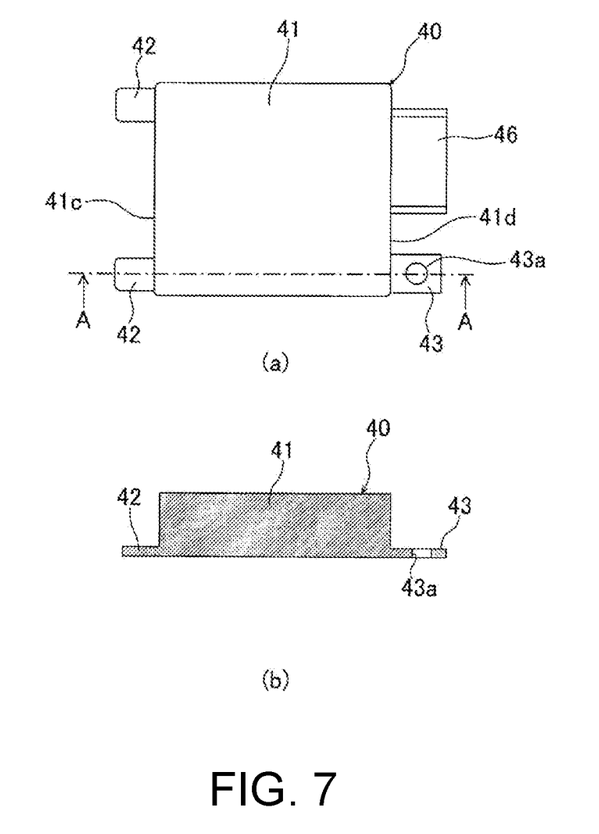
FIG. 7 is a view showing the radar device, in which (a) is a rear view, and (b) is a cross-sectional view taken along the A-A arrow in (a).

Here, the details of the mounting structure of the radar device 40 to the support bracket 20 will be described. FIG. 7 is a view showing the radar device 40, in which (a) is a rear view, and (b) is a cross-sectional view taken along the AA arrow in (a). In addition, the internal structure of the radar device 40 is omitted in the cross-sectional view of (b) of FIG. 7. As shown in the figure, the radar device 40 includes a box-shaped main body 41 having a substantially rectangular (rectangular) outer shape with a predetermined thickness, a pair of locking pieces (locking part) 42 and 42 provided on one side 41c of the left and right sides of the main body 41, and a fastening piece 43 for fastening a bolt (fastener) 45 (see FIG. 3) provided on a different side 41d. The locking pieces 42 are tongue-shaped protrusions formed at two locations near the upper end and the lower end of the one side 41c of the main body 41 and protruding in the lateral direction. In addition, the fastening piece 43 is a tongue-shaped protrusion formed at one location near the lower end of the different side 41d of the main body 41 and protruding in the lateral direction. The fastening piece 43 is provided with a through hole 43a through which the bolt 45 is inserted. In addition, a connecting part 46 for attaching and connecting a connector 51 (see FIGS. 1 and 3) to which a wiring 52 is connected is provided on the side (end surface) 41d of the main body 41 of the radar device 40.

Figure 8:
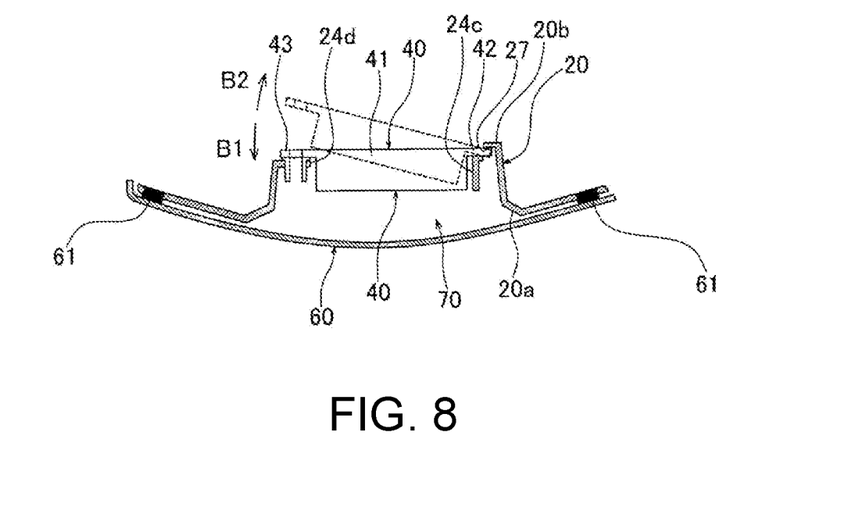
FIG. 8 is a view for illustrating the procedure for attaching and detaching the radar device.

FIG. 8 is a schematic view for illustrating the procedure for attaching and detaching the radar device to and from the support bracket. The radar device 40 is attached by inserting it into the opening 24 of the support bracket 20 from the rear surface 20b side. At this time, first, by inserting the locking pieces 42 and 42 of the radar device 40 into slits 27 and 27 provided on one side 24c of the opening 24 and attaching them, the locking pieces 42 and 42 are locked to the side 24c of the opening 24. In this state, as shown by an arrow B1 in FIG. 8, by rotating the main body 41 of the radar device 40 toward the opening 24 with the locking pieces 42 and 42 as fulcrums, the main body 41 of the radar device 40 is disposed in the opening 24 of the support bracket 20. As a result, the through hole 43a provided in the fastening piece 43 of the radar device 40 matches a screw hole 48 provided in another side 24d of the opening 24 of the support bracket 20, and by fastening the bolt 45 inserted through the through hole 43a to the screw hole 48, the fastening piece 43 is fixed to the another side 24d of the opening 24 by fastening the bolt 45. Thus, the main body 41 of the radar device 40 is attached to the opening 24 of the support bracket 20. In this state, the wiring 52 is connected to the radar device 40 by attaching the connector 51 to the connecting part 46 of the radar device 40.

For replacement or maintenance, the radar device 40 is detached from the opening 24 of the support bracket 20 by reversing the procedure described above. That is, first, by detaching the support bracket 20 from the housing 10 of the headlight unit 1, the rear surface 20b side of the support bracket 20 is accessed. Then, the bolt 45 is removed, and the main body 41 of the radar device 40 is rotated in a direction to be taken out from the opening 24 with the locking pieces 42 and 42 as fulcrums, as indicated by an arrow B2 in FIG. 8. After that, the locking pieces 42 and 42 are removed from the slits 27 and 27, and the radar device 40 is taken out from the opening 24.

The mounting structure of the radar device 40 included in the headlight unit 1 according to the embodiment includes the support bracket 20 that is attached to the housing 10 of the headlight unit 1 which is a member on the vehicle body side and supports the radar device 40 toward the front of the vehicle body (first direction), which is the object detection direction by the radar device 40, and includes a cover member 60 fixed to the front surface 20a of the support bracket 20 and disposed on the front side of the radar device 40; and the radar device 40 is housed in the housing chamber 70 defined by the cover member 60 and the support bracket 20.

According to the mounting structure of this embodiment, although the structure is relatively simple, the radar device 40 is supported via the support bracket 20, so that the positioning of the radar device 40 may be performed easily and accurately. In addition, since the radar device 40 is housed in the housing chamber 70 defined by the cover member 60 and the support bracket 20, the radar device 40 may be protected from being exposed to water from the outside and the like. Therefore, the object detection accuracy of the radar device 40 may be improved, and the durability of the radar device 40 may be improved.

In addition, in the mounting structure of the radar device 40 of this embodiment, the support bracket 20 has an opening 24 facing the radar device 40, and the radar device 40 in the housing chamber 70 may be attached and detached through the opening 24.

According to this configuration, it is possible to attach and detach the radar device 40 in the housing chamber 70 defined by the support bracket 20 and the cover member 60 through the opening 24 of the support bracket 20. Therefore, it is possible to attach and detach the radar device 40 in the housing chamber 70 without removing the cover member 60 fixed to the support bracket 20, thereby facilitating and speeding up the assembly work, replacement and maintenance work of the radar device 40.

In addition, in the mounting structure of the radar device 40 of this embodiment, when the radar device 40 is supported by the support bracket 20, the connecting part 46 of the radar device 40, the connector 51 and the wiring 52 connected to the connecting part 46 are configured to be exposed to the outside of the housing chamber 70 through the opening 24.

According to this configuration, when the radar device 40 is supported by the support bracket 20, the connecting part 46 of the radar device 40 and the connector 51 and the wiring 52 connected to the connecting part 46 are exposed to the outside of the housing chamber 70 from the opening 24. Therefore, the wiring 52 connected to the connecting part 46 of the radar device 40 may be pulled out to the outside of the housing chamber 70 and be disposed. In addition, since the connecting part 46 and the connector 51 and the wiring 52 connected to the connecting part 46 are exposed to the outside of the housing chamber 70 through the opening 24, the space in the housing chamber 70 may be saved, and the degree of freedom in the layout configuration of the radar device 40 may be increased.

In addition, in the mounting structure of the radar device 40 of this embodiment, the radar device 40 includes the locking pieces (locking part) 42 and 42 on one side thereof that are locked to the edge of the opening 24, and includes the fastening piece (fastening part) 43 on another side that is fastened and fixed with the bolt (fastener) 45 to the edge of the opening 24.

According to this configuration, the locking pieces 42 and 42 provided on one side of the radar device 40 are locked to the edge of the opening 24, and in this state, the fastening piece 43 provided on another side of the radar device 40 is fastened and fixed to the edge of the opening 24 with the bolt 45, whereby the radar device 40 may be attached. Therefore, it is possible to facilitate the work of attaching and detaching the radar device 40 to and from the support bracket 20, and to reduce the number of parts required for fixing the support bracket 20, thereby reducing the number of parts.

Moreover, in the mounting structure of the radar device 40 of this embodiment, the cover member 60 is welded and fixed to the support bracket 20.

According to this configuration, it is possible to reliably prevent the cover member 60 fixed to the support bracket 20 from coming off. Further, when the support bracket 20 is provided with the opening 24, the radar device 40 may be attached and detached in the housing chamber 70 through the opening 24, so there is no need to remove the cover member 60 from the support bracket 20. Therefore, even if the cover member 60 is welded and fixed to the support bracket 20, the easy maintenance of the parts is not affected. As a result, it is possible to improve the durability of the radar device 40 and its mounting structure and ensure easy maintenance.

Although the embodiments of the disclosure have been described above, the disclosure is not limited to the above embodiments, and various modifications may be made within the scope of the technical ideas described in the claims, the specification and the drawings. For example, in the above embodiments, the support bracket is attached to the housing of the headlight unit mounted on the vehicle body, but the support bracket provided in the mounting structure of the disclosure may be attached to a part other than the housing of the headlight unit as long as it is a part mounted on the vehicle body (part on the vehicle body side).

What is claimed is:

1. A mounting structure of an object detection device for detecting objects to a vehicle body, the mounting structure comprising:
   a support bracket attached to the vehicle body side for supporting the object detection device in a first direction, which is an object detection direction by the object detection device; and
   a cover member fixed to the first direction side of the support bracket and disposed on the first direction side of the object detection device,
   wherein the object detection device is housed in a housing chamber defined by the cover member and the support bracket,
   wherein the support bracket comprises an opening that faces the object detection device, the opening is formed as a through hole penetrating the support bracket in the first direction, the housing chamber is located at the first direction side of the opening, and the object detection device is detachably mounted through the opening.

2. The mounting structure of the object detection device to the vehicle body according to claim 1, wherein a recess surrounded by side walls of the support bracket and the cover member arranged in the first direction side of the support bracket form the housing chamber, and the support bracket is fixed to a front surface of the housing of the vehicle body.

3. The mounting structure of the object detection device to the vehicle body according to claim 1, wherein in a state in which the object detection device is supported by the support bracket, a connecting part for connecting a wiring to the object detection device is exposed to an outside of the housing chamber through the opening.

4. The mounting structure of the object detection device to the vehicle body according to claim 1, wherein the object detection device comprises:
   on one side of the object detection device, a locking part that is locked to an edge of the opening; and
   on another side of the object detection device, a fastening part that is fastened and fixed to the edge of the opening with a fastener.

5. The mounting structure of the object detection device to the vehicle body according to claim 3, wherein the object detection device comprises:
   on one side of the object detection device, a locking part that is locked to an edge of the opening; and
   on another side of the object detection device, a fastening part that is fastened and fixed to the edge of the opening with a fastener.

6. The mounting structure of the object detection device to the vehicle body according to claim 1, wherein the cover member is welded and fixed to the support bracket.

7. The mounting structure of the object detection device to the vehicle body according to claim 3, wherein the cover member is welded and fixed to the support bracket.

8. The mounting structure of the object detection device to the vehicle body according to claim 4, wherein the cover member is welded and fixed to the support bracket.

9. The mounting structure of the object detection device to the vehicle body according to claim 5, wherein the cover member is welded and fixed to the support bracket.

10. The mounting structure of the object detection device to the vehicle body according to claim 1, wherein the support bracket is attached to a housing that houses a light source of a headlight unit mounted on the vehicle body, and the first direction is a direction including a front of the vehicle body.

11. The mounting structure of the object detection device to the vehicle body according to claim 3, wherein the support bracket is attached to a housing that houses a light source of a headlight unit mounted on the vehicle body, and the first direction is a direction including a front of the vehicle body.

12. The mounting structure of the object detection device to the vehicle body according to claim 4, wherein the support bracket is attached to a housing that houses a light source of a headlight unit mounted on the vehicle body, and the first direction is a direction including a front of the vehicle body.

13. The mounting structure of the object detection device to the vehicle body according to claim 5, wherein the support bracket is attached to a housing that houses a light source of a headlight unit mounted on the vehicle body, and the first direction is a direction including a front of the vehicle body.

14. The mounting structure of the object detection device to the vehicle body according to claim 6, wherein the support bracket is attached to a housing that houses a light source of a headlight unit mounted on the vehicle body, and the first direction is a direction including a front of the vehicle body.

15. The mounting structure of the object detection device to the vehicle body according to claim 7, wherein the support bracket is attached to a housing that houses a light source of a headlight unit mounted on the vehicle body, and the first direction is a direction including a front of the vehicle body.

16. The mounting structure of the object detection device to the vehicle body according to claim 8, wherein the support bracket is attached to a housing that houses a light source of a headlight unit mounted on the vehicle body, and the first direction is a direction including a front of the vehicle body.

17. The mounting structure of the object detection device to the vehicle body according to claim 9, wherein the support bracket is attached to a housing that houses a light source of a headlight unit mounted on the vehicle body, and the first direction is a direction including a front of the vehicle body.

\* \* \* \* \*